(12) United States Patent
Choi et al.

(10) Patent No.: US 11,700,093 B2
(45) Date of Patent: Jul. 11, 2023

(54) METHOD FOR TRANSMITTING AND RECEIVING SRS AND COMMUNICATION DEVICE THEREFOR

(71) Applicant: LG ELECTRONICS INC., Seoul (KR)

(72) Inventors: Kukheon Choi, Seoul (KR); Jonghyun Park, Seoul (KR); Jiwon Kang, Seoul (KR); Kyuseok Kim, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 186 days.

(21) Appl. No.: 16/652,978

(22) PCT Filed: Oct. 10, 2018

(86) PCT No.: PCT/KR2018/011889
§ 371 (c)(1),
(2) Date: Apr. 1, 2020

(87) PCT Pub. No.: WO2019/074266
PCT Pub. Date: Apr. 18, 2019

(65) Prior Publication Data
US 2022/0085934 A1    Mar. 17, 2022

Related U.S. Application Data

(60) Provisional application No. 62/570,106, filed on Oct. 10, 2017.

(51) Int. Cl.
*H04L 5/00* (2006.01)
*H04W 72/0446* (2023.01)
*H04W 72/20* (2023.01)

(52) U.S. Cl.
CPC .......... *H04L 5/0048* (2013.01); *H04L 5/0012* (2013.01); *H04W 72/0446* (2013.01); *H04W 72/20* (2023.01)

(58) Field of Classification Search
CPC ... H04L 5/0048; H04L 5/0012; H04L 5/0051; H04L 5/001; H04L 5/0094;
(Continued)

(56) References Cited

U.S. PATENT DOCUMENTS

2009/0238241 A1* 9/2009 Hooli ..................... H04L 5/0012
375/E1.033
2011/0007778 A1* 1/2011 Kishiyama ............ H04L 5/0007
375/E1.033
(Continued)

FOREIGN PATENT DOCUMENTS

EP           3684124 A4 *  8/2021  ......... H04L 25/0226
WO    WO-2011035627 A1 *  3/2011  ........... H04L 5/0078
WO    WO-2017132593 A1 *  8/2017  ........... H04L 5/0051

OTHER PUBLICATIONS

Huawei et al., "UL SRS mapping and hopping", 3GPP TSG RAN WG1 Meeting #90, R1-1713771, Prague, Czech Republic, Aug. 21-25, 2017, Total pp. 4 (Year: 2017).*
(Continued)

*Primary Examiner* — Shah M Rahman
(74) *Attorney, Agent, or Firm* — Lee Hong Degerman Kang & Waimey

(57) ABSTRACT

A method for transmitting an SRS by a user equipment may comprise the steps of: transmitting, to a base station, user equipment capability information including information on a frequency bandwidth where SRS frequency hopping for the user equipment is possible; receiving, from the base station, first information on an SRS bandwidth configuration and second information on the start point of an SRS frequency for transmission of an SRS; and transmitting the
(Continued)

SRS to the base station on the basis of the first information and the second information, wherein the frequency bandwidth where SRS frequency hopping for the user equipment is possible corresponds to a partial frequency bandwidth within a bandwidth part (BWP) configured for transmission of the SRS. The UE is capable of communicating with at least one of another UE, a UE related to an autonomous driving vehicle, a base station or a network.

13 Claims, 11 Drawing Sheets

(58) Field of Classification Search
CPC ......... H04W 72/0446; H04W 72/0453; H04W 72/0406; H04W 72/20; H04W 72/51
See application file for complete search history.

(56) References Cited

U.S. PATENT DOCUMENTS

| | | | | |
|---|---|---|---|---|
| 2011/0164489 | A1* | 7/2011 | Papasakellariou | H04W 72/23 370/431 |
| 2012/0106495 | A1* | 5/2012 | Yang | H04L 5/0094 370/329 |
| 2012/0113967 | A1* | 5/2012 | Smith | H04B 1/7143 375/E1.033 |
| 2014/0328273 | A1* | 11/2014 | Noh | H04L 5/0023 370/329 |
| 2015/0071195 | A1* | 3/2015 | Park | H04L 5/0048 370/329 |
| 2015/0304994 | A1* | 10/2015 | Kim | H04L 27/2601 370/280 |
| 2017/0150482 | A1* | 5/2017 | Chen | H04L 5/0048 |
| 2017/0222856 | A1* | 8/2017 | Dinan | H04L 5/001 |
| 2019/0058562 | A1* | 2/2019 | Yoo | H04L 5/0094 |
| 2019/0104522 | A1* | 4/2019 | Yoo | H04L 5/0048 |
| 2019/0268185 | A1* | 8/2019 | Wang | H04L 27/2613 |
| 2020/0044805 | A1* | 2/2020 | Iwai | H04L 5/0051 |
| 2020/0059384 | A1* | 2/2020 | Zhang | H04L 5/0051 |
| 2020/0067621 | A1* | 2/2020 | Hu | H04J 11/0023 |
| 2020/0177353 | A1* | 6/2020 | Ding | H04L 5/0094 |
| 2020/0204407 | A1* | 6/2020 | Liu | H04L 25/0226 |
| 2020/0213161 | A1* | 7/2020 | Zhang | H04B 1/7143 |
| 2020/0244489 | A1* | 7/2020 | Rahman | H04L 5/0041 |

OTHER PUBLICATIONS

PCT International Application No. PCT/KR2018/011889, Written Opinion of the International Searching Authority dated Jan. 16, 2019, 22 pages.

Huawei, et al., "UL SRS design for beam management and CSI acquisition", 3GPP TSG RAN WG1 Meeting #90, R1-1712238, Aug. 2017, 12 pages.

LG Electronics, "Discussion on rate matching", 3GPP TSG RAN WG1 Meeting NR#3, R1-1715856, Sep. 2017, 8 pages.

NTT Docomo, "Frequency-domain resource allocation", 3GPP TSG RAN WG1 Meeting #90, R1-1713948, Aug. 2017, 6 pages.

LG Electronics, "On SRS design and related operations", 3GPP TSG RAN WG1 Meeting NR AH#3, R1-1715867, Sep. 2017, 4 pages.

Qualcomm, "Discussion on SRS Design", 3GPP TSG RAN WG1 Meeting #90, R1-1713412, Aug. 2017, 7 pages.

* cited by examiner (a) Example of UE sounding
where intra-slot hopping is performed in partial band (b) Example in which no hopping is allowed in BWP

METHOD FOR TRANSMITTING AND RECEIVING SRS AND COMMUNICATION DEVICE THEREFOR

CROSS-REFERENCE TO RELATED APPLICATIONS

This application is the National Stage filing under 35 U.S.C. 371 of International Application No. PCT/KR2018/011889, filed on Oct. 10, 2018, which claims the benefit of U.S. Provisional Application No. 62/570,106, filed on Oct. 10, 2017, the contents of which are all hereby incorporated by reference herein in their entirety.

TECHNICAL FIELD

The present disclosure relates to a wireless communication system, and more particularly, to methods for transmitting and receiving a sounding reference signal (SRS) and communication devices therefor.

BACKGROUND ART

When a new radio access technology (RAT) system is introduced, as more and more communication devices require larger communication capacity, there is a need for improved mobile broadband communication as compared to existing RAT.

In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, New RAT will provide services considering enhanced mobile broadband communication (eMBB), massive MTC (mMTC), URLLC (Ultra-Reliable Low-Latency Communication), etc. In a next-generation 5G system, scenarios may be divided into Enhanced Mobile Broadband (eMBB)/Ultra-reliable Machine-Type Communications (uMTC)/Massive Machine-Type Communications (mMTC), etc. eMBB is a next-generation mobile communication scenario having high spectrum efficiency, high user experienced data rate, high peak data rate, etc., uMTC is a next-generation mobile communication scenario having ultra-reliability, ultra-low latency, ultra-high availability, etc. (e.g., V2X, emergency service, remote control), and mMTC is a next-generation mobile communication scenario having low cost, low energy, short packet, and massive connectivity (e.g., IoT).

DISCLOSURE

Technical Problem

An object of the present disclosure is to provide a method of transmitting an SRS by a user equipment (UE).

Another object of the present disclosure is to provide a method of receiving an SRS by a base station (BS).

Another object of the present disclosure is to provide a UE for transmitting an SRS.

Another object of the present disclosure is to provide a BS for receiving an SRS.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of transmitting a sounding reference signal (SRS) by a user equipment (UE). The method may include: transmitting, to a base station (BS), UE capability information including information on a frequency bandwidth in which the UE is capable of performing SRS frequency hopping; receiving, from the BS, first information on an SRS bandwidth configuration and second information on an SRS frequency start position for the SRS transmission; and transmitting, to the BS, the SRS based on the first and second information. The frequency bandwidth in which the UE is capable of performing the SRS frequency hopping may correspond to a partial frequency bandwidth within a bandwidth part (BWP) configured for the SRS transmission. The first and second information may be determined by the UE capability information. The method may further include receiving, from the BS, third information on whether the UE operates in a mode of transmitting the SRS by performing frequency hopping at a frequency bandwidth level capable of the SRS frequency hopping within the BWP, and the SRS may be transmitted further based on the third information. The first information may be determined by the number of SRS symbols configured in a predetermined slot. The method may further include receiving information on the BWP configured for the SRS transmission at the UE. The SRS frequency hopping may be inter-slot hopping or intra-slot hopping.

In another aspect of the present disclosure, provided herein is a method of receiving a sounding reference signal (SRS) by a base station (BS). The method may include: receiving, from a user equipment (UE), UE capability information including information on a frequency bandwidth in which the UE is capable of performing SRS frequency hopping; configuring first information on an SRS bandwidth configuration and second information on an SRS frequency start position for the SRS transmission based on the UE capability information; transmitting, to the UE, the first and second information; and receiving, from the UE, the SRS based on the first and second information. The frequency bandwidth in which the UE is capable of performing the SRS frequency hopping may correspond to a partial frequency bandwidth within a bandwidth part (BWP) configured for the SRS transmission.

The method may further include transmitting, to the UE, third information on whether the UE operates in a mode of transmitting the SRS by performing frequency hopping at a frequency bandwidth level capable of the SRS frequency hopping within the BWP, and the SRS may be received further based on the third information. The first information may be configured based on the number of SRS symbols configured in a predetermined slot. The method may further include transmitting, to the UE, information on the BWP configured for the SRS transmission.

In still another aspect of the present disclosure, provided herein is a user equipment (UE) for transmitting a sounding reference signal (SRS). The UE may include: a transmitter configured to transmit, to a base station (BS), UE capability information including information on a frequency bandwidth in which the UE is capable of performing SRS frequency hopping; a received configured to receive, from the BS, first information on an SRS bandwidth configuration and second information on an SRS frequency start position for the SRS transmission; and a processor configured to control the transmitter to transmit, to the BS, the SRS based on the first and second information. The frequency bandwidth in which the UE is capable of performing the SRS frequency hopping may correspond to a partial frequency bandwidth within a bandwidth part (BWP) configured for the SRS transmission. The receiver may be configured to receive, from the BS, third information on whether the UE operates in a mode of transmitting the SRS by performing frequency hopping at a frequency bandwidth level capable of the SRS frequency hopping within the BWP, and the processor may be configured to control the transmitter to transmit the SRS further based on the third information. The receiver may be configured to receive information on the BWP configured for the SRS transmission at the UE.

In a further aspect of the present disclosure, provided herein is a base station (BS) for receiving a sounding reference signal (SRS). The BS may include: a receiver configured to receive, from a user equipment (UE), UE capability information including information on a frequency bandwidth in which the UE is capable of performing SRS frequency hopping; a processor configured to configure first information on an SRS bandwidth configuration and second information on an SRS frequency start position for the SRS transmission based on the UE capability information; and a transmitter configured to transmit, to the UE, the first and second information. The processor may be configured to control the receiver to receive, from the UE, the SRS based on the first and second information. The frequency bandwidth in which the UE is capable of performing the SRS frequency hopping may correspond to a partial frequency bandwidth within a bandwidth part (BWP) configured for the SRS transmission. The transmitter may be configured to transmit, to the UE, third information on whether the UE operates in a mode of transmitting the SRS by performing frequency hopping at a frequency bandwidth level capable of the SRS frequency hopping within the BWP, and the processor may be configured to control the receiver to receive the SRS further based on the third information.

ADVANTAGEOUS EFFECTS

According to the present disclosure, a sounding reference signal (SRS) configuration method may allow inter-slot hopping to be performed at an instance when RF retuning is performed, thereby preventing a distortion caused by the RF retuning.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

BEST MODE

Figure 1:
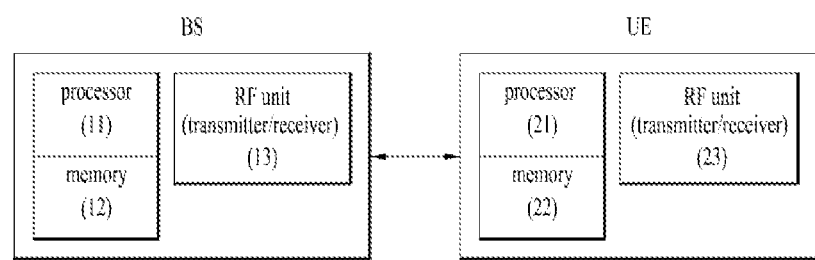
FIG. 1 is a diagram illustrating a wireless communication system for implementing the present disclosure.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP), gNode B and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram illustrating a wireless communication system for implementing the present disclosure.

Referring to FIG. 1, the wireless communication system includes a base station (BS) 10 and one or more UEs 20. On DL, a transmitter may be a part of the BS and a receiver may be a part of the UEs 20. On UL, the BS 10 may include a processor 11, a memory 12, and a radio frequency (RF) unit 13 (a transmitter and a receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive a radio signal. The UE 20 may include a processor 21, a memory 22, and an RF unit 23 (a transmitter and a receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive a radio signal. Each of the BS 10 and/or the UE 20 may have a single antenna or multiple antennas. When at least one of the BS 10 and the UE 20 has multiple antennas, the wireless communication system may be called a multiple input multiple output (MIMO) system.

In the present specification, while the processor 21 of the UE and the processor 11 of the BS perform operations of processing signals and data, except for a function of receiving and transmitting signals, performed respectively by the UE 20 and the BS 10, and a storage function, the processors 11 and 21 will not be particularly mentioned hereinbelow, for convenience of description. Although the processors 11 and 21 are not particularly mentioned, it may be appreciated that operations such as data processing other than signal reception or transmission may be performed by the processors 11 and 21.

Layers of a radio interface protocol between the UE 20 and the BS 10 of the wireless communication system (network) may be classified into a first layer L1, a second layer L2, and a third layer L3, based on 3 lower layers of open systems interconnection (OSI) model well known in communication systems. A physical layer belongs to the first layer and provides an information transfer service via a physical channel. A radio resource control (RRC) layer belongs to the third layer and provides control radio resources between the UE and the network. The UE 10 and the BS 20 may exchange RRC messages with each other through the wireless communication network and the RRC layers.

Analog Beamforming

In a millimeter wave (mmW) system, since a wavelength becomes shorter, a plurality of antenna elements may be installed in the same area. That is, considering that the wavelength at a band of 30 GHz is 1 cm, a total of 64 (8×8) antenna elements may be installed in a 4*4 cm panel at intervals of 0.5 lambda (wavelength) in the case of a 2-dimensional array. Therefore, in the mmW system, it is possible to improve coverage or throughput by increasing beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

As an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 2A:
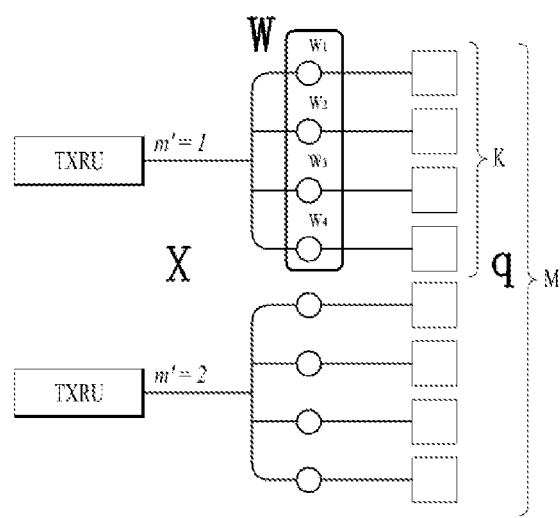
FIG. 2a is a diagram illustrating TXRU virtualization model option 1 (sub-array model) and FIG. 2b is a diagram illustrating TXRU virtualization model option 2 (full connection model).
Figure 2B:
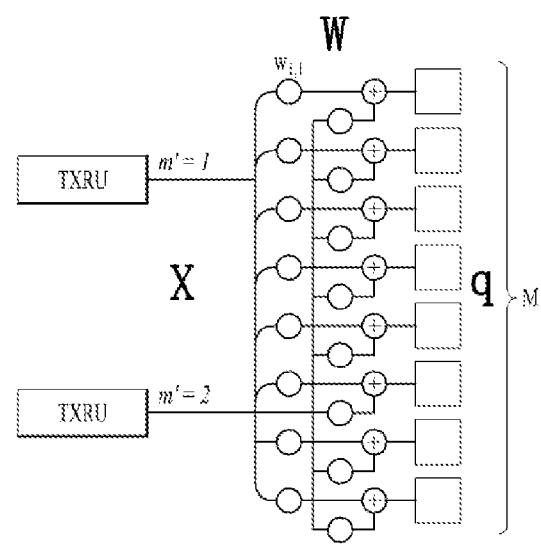

FIG. 2a is a diagram illustrating TXRU virtualization model option 1 (sub-array model) and FIG. 2b is a diagram illustrating TXRU virtualization model option 2 (full connection model).

FIGS. 2a and 2b show representative examples of a method of connecting TXRUs and antenna elements. Here, the TXRU virtualization model shows a relationship between TXRU output signals and antenna element output signals. FIG. 2a shows a method of connecting TXRUs to sub-arrays. In this case, one antenna element is connected to one TXRU. In contrast, FIG. 2b shows a method of connecting all TXRUs to all antenna elements. In this case, all antenna elements are connected to all TXRUs. In FIGS. 2a and 2b, W indicates a phase vector weighted by an analog phase shifter. That is, W is a major parameter determining the direction of the analog beamforming. In this case, the mapping relationship between channel state information-reference signal (CSI-RS) antenna ports and TXRUs may be 1-to-1 or 1-to-many.

Hybrid Beamforming

Figure 3:
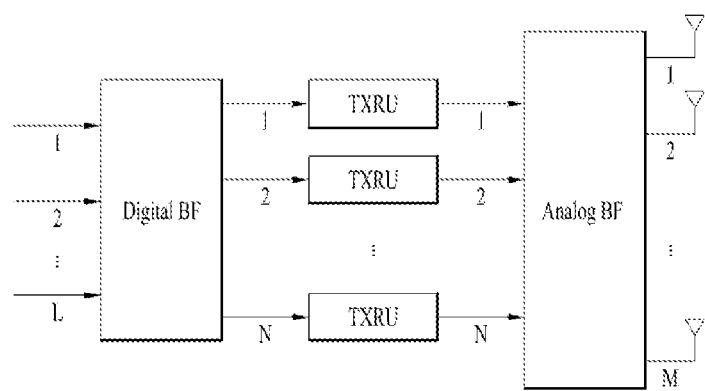
FIG. 3 is a block diagram for hybrid beamforming.

FIG. 3 is a block diagram for hybrid beamforming.

Figure 4:
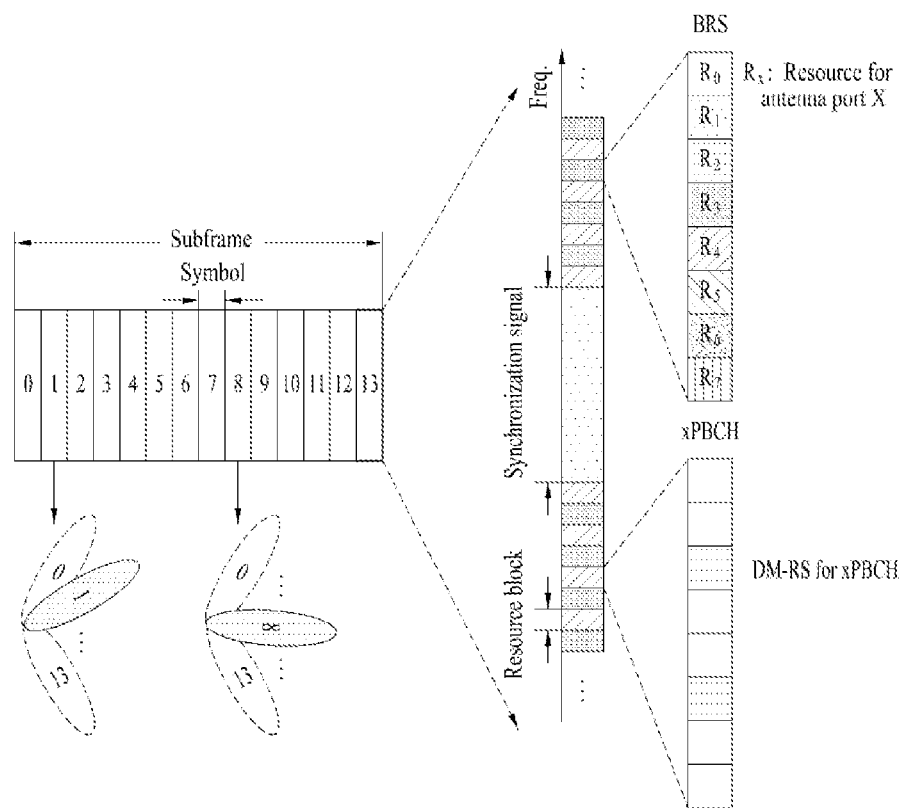
FIG. 4 is a diagram illustrating beams mapped to BRS symbols in hybrid beamforming.

If a plurality of antennas is used in a new RAT system, a hybrid beamforming scheme which is a combination of digital beamforming and analog beamforming may be used. At this time, analog beamforming (or RF beamforming) means operation of performing precoding (or combining) at an RF stage. In the hybrid beamforming scheme, each of a baseband stage and an RF stage uses a precoding (or combining) method, thereby reducing the number of RF chains and the number of D/A (or A/D) converters and obtaining performance similar to performance of digital beamforming. For convenience of description, as shown in FIG. 4, the hybrid beamforming structure may be expressed by N transceivers (TXRUs) and M physical antennas. Digital beamforming for L data layers to be transmitted by a transmission side may be expressed by an N×L matrix, N digital signals are converted into analog signals through TXRUs and then analog beamforming expressed by an M×N matrix is applied.

FIG. 3 shows a hybrid beamforming structure in terms of the TXRUs and physical antennas. At this time, in FIG. 3, the number of digital beams is L and the number of analog beams is N. Further, in the new RAT system, a BS is designed to change analog beamforming in symbol units, thereby supporting more efficient beamforming for a UE located in a specific region. Furthermore, in FIG. 3, when N TXRUs and M RF antennas are defined as one antenna panel, up to a method of introducing a plurality of antenna panels, to which independent hybrid beamforming is applicable, is being considered in the new RAT system.

When the BS uses a plurality of analog beams, since an analog beam which is advantageous for signal reception may differ between UEs, the BS may consider beam sweeping operation in which the plurality of analog beams, which will be applied by the BS in a specific subframe (SF), is changed according to symbol with respect to at least synchronization signals, system information, paging, etc. such that all UEs have reception opportunities.

FIG. 4 is a diagram illustrating beams mapped to BRS symbols in hybrid beamforming.

FIG. 4 shows the beam sweeping operation with respect to synchronization signals and system information in a downlink (DL) transmission procedure. In FIG. 4, a physical resource (or physical channel) through which the system information of the new RAT system is transmitted in a broadcast manner is named xPBCH (physical broadcast channel). At this time, analog beams belonging to different antenna panels may be simultaneously transmitted within one symbol, and, in order to measure a channel per analog beam, as shown in FIG. 4, a method of introducing a beam reference signal (BRS) which is an RS transmitted by applying a single analog beam (corresponding to a specific analog panel) may be considered. The BRS may be defined with respect to a plurality of antenna ports and each antenna port of the BRS may correspond to a single analog beam. Although the RS used to measure the beam is given BRS in FIG. 5, the RS used to measure the beam may be named another name. At this time, unlike the BRS, a synchronization signal or xPBCH may be transmitted by applying all analog beams of an analog beam group, such that an arbitrary UE properly receives the synchronization signal or xPBCH.

Figure 5:
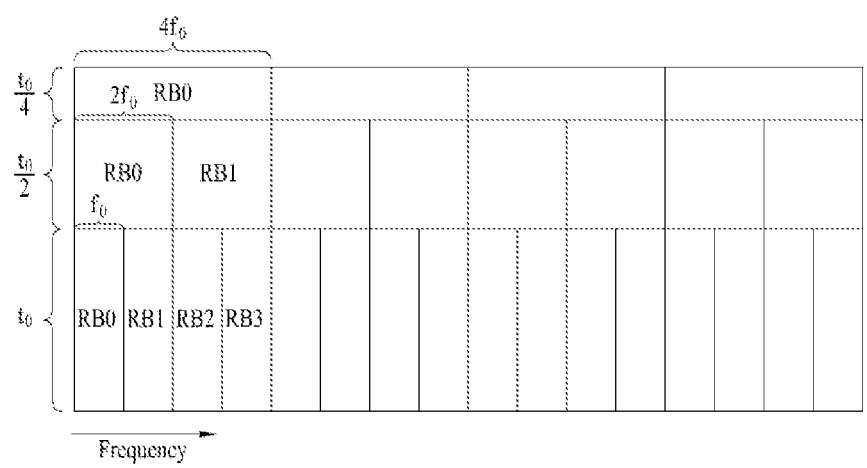
FIG. 5 is a diagram illustrating symbol/sub-symbol alignment between different numerologies.

FIG. 5 is a diagram illustrating symbol/sub-symbol alignment between different numerologies.

New RAT(NR) Numerology Characteristics

In NR, a method of supporting scalable numerology is being considered. That is, a subcarrier spacing of NR is (2n×15) kHz and n is an integer. From the nested viewpoint, a subset or a superset (at least 15, 30, 60, 120, 240, and 480 kHz) is being considered as a main subcarrier spacing. Symbol or sub-symbol alignment between different numerologies was supported by performing control to have the same CP overhead ratio.

In addition, the numerology is determined in a structure for dynamically allocating time/frequency granularity according to services (eMBB, URLLC and mMTC) and scenarios (high speed, etc.).

In the following, the notation of parameters related to SRS bandwidth (BW) configurations, which will be explained in the present disclosure, are described.

$C_{SRS}$:$C_{SRS}$ denotes SRS BW configurations (a UE may receive $C_{SRS}$ through higher layer signaling (e.g., RRC signaling)).

$B_{SRS}$:$B_{SRS}$ denotes information on an SRS BW as a UE-specific parameter, 'srs-Bandwidth'. For example, $B_{SRS}$ may have a value of 0 to 3 (a UE may receive $B_{SRS}$ through higher layer signaling (e.g., RRC signaling)).

$m_{SRS0}$:$m_{SRS0}$ denotes the maximum SRS BW in an SRS configuration.

The following agreements are made regarding SRS BWs in the NR.

TABLE 1

NR supports a single SRS bandwidth table consist of multiple value of $C_{SRS}$ and 4 values of $B_{SRS}$.
The frequency domain starting position of a SRS allocation (analogous to $k_0^{(p)}$ in LTE) is UE specifically configurable such that it is aligned on a common grid with 4 PRB granularity defined on a wideband CC from network perspective
Note: This can enable alignment of SRS resources of different UEs with partially overlapped BWPs multiplexed on the same comb The agreements in Table 1 are made regarding SRS BW configurations in the NR system. Instead of being provided with multiple tables for various bandwidth parts (BWPs), each UE may be configured with BWPs for sounding depending on its sounding capability or the configuration of a BS (gNB). Thus, the BS may not need to implicitly configure one table among multiple SRS BW tables for a UE based on a specific uplink system BW as in the LTE system. The UE may perform inter-slot hopping or intra-slot hopping according to the configurations of $B_{SRS}$ and $C_{SRS}$ in a single table. Here, the inter-slot hopping may refer to hopping at a slot level or on a slot basis, and the intra-hopping may refer to hopping at a symbol level or on a symbol basis.

To maintain orthogonality between resources of UEs having SRS assigned thereto, the BS may UE-specifically configure an SRS frequency (domain) start position in an SRS BW grid and then transmit information on the SRS frequency start position to the UE. However, since a position grid operates in common, the BS may align SRS BWs (or sounding BWs) of UEs.

The present disclosure relates to a method of enabling hopping in a specific range by considering sounding for a configured uplink BWP for UEs incapable of performing transmission in the configured BWP due to limitations such as a UE link budget (e.g., cell-edge UEs) and UEs with hopping ranges that do not cover the configured BWP (e.g., UEs that require a time for RF retuning since the UEs have values greater than k, which is a range of BWs where a UE is capable of performing the sounding and is less than the configured BWP).

Figure 6:
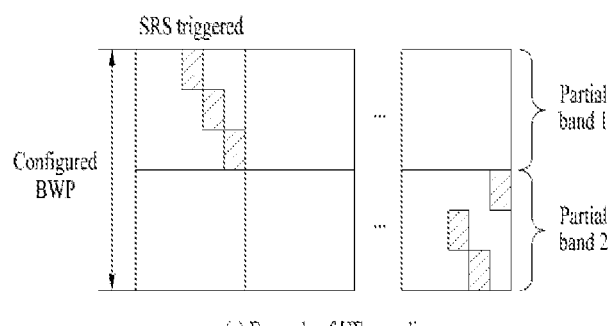
FIG. 6 is a diagram illustrating examples of intra-slot hopping in a specific range (assumed to be one partial bandwidth (BW)) within one bandwidth part (BWP) depending on the sounding capability of a user equipment (UE).
Figure 6:
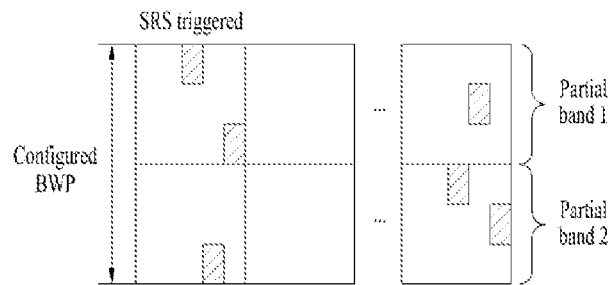

FIG. 6 is a diagram illustrating examples of intra-slot hopping in a specific range (assumed as one partial BW) within one BWP depending on the sounding capability of a UE.

FIG. 6 (a) shows an example in which no hopping is allowed in the BWP, and FIG. 6 (b) shows an example of UE sounding where the intra-slot hopping is performed in a partial band. Specifically, FIG. 6 (a) shows that no hopping is allowed in the BWP after the intra-slot hopping is performed across two partial bands, and FIG. 6 (b) shows that the intra-slot hopping is performed in one partial band of the BWP. Herein, a partial band refers to a part of a BW where the intra-slot hopping is allowed within one configured BWP.

Tables 2 and 3 are SRS BW configuration tables in the NR system. Information in Tables 2 and 3 may be shared in advance by a BS and a UE.

TABLE 2

| | 1st Half of Table (SRS BW ≤ 96 PRBs) | | | | | | | | |
|---|---|---|---|---|---|---|---|---|---|
| | $B_{SRS}=0$ | | $B_{SRS}=1$ | | $B_{SRS}=2$ | | $B_{SRS}=3$ | | |
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ | Notes |
| 0 | 4 | 1 | 4 | 1 | 4 | 1 | 4 | 1 | From LTE tables |
| 1 | 8 | 1 | 4 | 2 | 4 | 1 | 4 | 1 | $m_{SRS,0}$ is multiple of 8 From LTE tables |
| 2 | 12 | 1 | 4 | 3 | 4 | 1 | 4 | 1 | From LTE tables |
| 3 | 16 | 1 | 4 | 4 | 4 | 1 | 4 | 1 | From LTE tables |
| 4 | 16 | 1 | 8 | 2 | 4 | 2 | 4 | 1 | $m_{SRS,0}$ is multiple of 16 |
| 5 | 20 | 1 | 4 | 5 | 4 | 1 | 4 | 1 | From LTE tables |
| 6 | 24 | 1 | 4 | 6 | 4 | 1 | 4 | 1 | From LTE tables |
| 7 | 24 | 1 | 12 | 2 | 4 | 3 | 4 | 1 | $m_{SRS,0}$ is multiple of 8 |
| 8 | 28 | 1 | 4 | 7 | 4 | 1 | 4 | 1 | Supported NR BW |
| 9 | 32 | 1 | 16 | 2 | 8 | 2 | 4 | 2 | $m_{SRS,0}$ is multiple of 16 From LTE tables |
| 10 | 36 | 1 | 12 | 3 | 4 | 3 | 4 | 1 | From LTE tables |
| 11 | 40 | 1 | 20 | 2 | 4 | 5 | 4 | 1 | $m_{SRS,0}$ is multiple of 8 From LTE tables |
| 12 | 48 | 1 | 16 | 3 | 8 | 2 | 4 | 2 | From LTE tables |
| 13 | 48 | 1 | 24 | 2 | 12 | 2 | 4 | 3 | $m_{SRS,0}$ is multiple of 16 From LTE tables |
| 14 | 52 | 1 | 4 | 13 | 4 | 1 | 4 | 1 | Supported NR BW |
| 15 | 56 | 1 | 28 | 2 | 4 | 7 | 4 | 1 | $m_{SRS,0}$ is multiple of 8 |
| 16 | 60 | 1 | 2- | 3 | 4 | 5 | 4 | 1 | From LTE tables |
| 17 | 64 | 1 | 32 | 2 | 16 | 2 | 4 | 4 | $m_{SRS,0}$ is multiple of 16 From LTE tables |
| 18 | 72 | 1 | 24 | 3 | 4 | 6 | 4 | 1 | From LTE tables |
| 19 | 72 | 1 | 36 | 2 | 12 | 3 | 4 | 1 | $m_{SRS,0}$ is multiple of 8 |
| 20 | 76 | 1 | 4 | 19 | 4 | 1 | 4 | 1 | Supported NR BW |
| 21 | 80 | 1 | 40 | 2 | 20 | 2 | 4 | 5 | $m_{SRS,0}$ is multiple of 16 From LTE tables |
| 22 | 88 | 1 | 44 | 2 | 11 | 4 | 4 | 1 | $m_{SRS,0}$ is multiple of 8 |
| 23 | 96 | 1 | 32 | 3 | 16 | 2 | 4 | 4 | From LTE tables |
| 24 | 96 | 1 | 48 | 2 | 24 | 2 | 4 | 6 | $m_{SRS,0}$ is multiple of 16 From LTE tables |

TABLE 3

| | 2nd Half of Table (96 < SRS BW ≤ 272 PRBs) | | | | | | | | |
|---|---|---|---|---|---|---|---|---|---|
| | $B_{SRS}=0$ | | $B_{SRS}=1$ | | $B_{SRS}=2$ | | $B_{SRS}=3$ | | |
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ | Notes |
| 25 | 104 | 1 | 52 | 2 | 4 | 13 | 4 | 1 | $m_{SRS,0}$ is multiple of 8 |
| 26 | 112 | 1 | 56 | 2 | 28 | 2 | 4 | 7 | $m_{SRS,0}$ is multiple of 16 |
| 27 | 120 | 1 | 60 | 2 | 20 | 3 | 4 | 5 | $m_{SRS,0}$ is multiple of 8 |
| 28 | 128 | 1 | 64 | 2 | 32 | 2 | 4 | 8 | $m_{SRS,0}$ is multiple of 16 |

TABLE 3-continued

2nd Half of Table (96 < SRS BW ≤ 272 PRBs)

| $C_{SRS}$ | $B_{SRS}=0$ | | $B_{SRS}=1$ | | $B_{SRS}=2$ | | $B_{SRS}=3$ | | Notes |
|---|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ | |
| 29 | 132 | 1 | 12 | 11 | 4 | 3 | 4 | 1 | Supported NR BW |
| 30 | 136 | 1 | 68 | 2 | 4 | 17 | 4 | 1 | $m_{SRS,0}$ is multiple of 8 |
| 31 | 144 | 1 | 72 | 2 | 36 | 2 | 4 | 9 | $m_{SRS,0}$ is multiple of 16 |
| 32 | 152 | 1 | 76 | 2 | 4 | 19 | 4 | 1 | $m_{SRS,0}$ is multiple of 8 |
| 33 | 160 | 1 | 80 | 2 | 40 | 2 | 4 | 10 | $m_{SRS,0}$ is multiple of 16 |
| 34 | 168 | 1 | 84 | 2 | 28 | 3 | 4 | 7 | $m_{SRS,0}$ is multiple of 8 |
| 35 | 176 | 1 | 88 | 2 | 44 | 2 | 4 | 11 | $m_{SRS,0}$ is multiple of 16 |
| 36 | 184 | 1 | 92 | 2 | 4 | 23 | 4 | 1 | $m_{SRS,0}$ is multiple of 8 |
| 37 | 192 | 1 | 96 | 2 | 48 | 2 | 4 | 12 | $m_{SRS,0}$ is multiple of 16 |
| 38 | 200 | 1 | 100 | 2 | 20 | 5 | 4 | 5 | $m_{SRS,0}$ is multiple of 8 |
| 39 | 208 | 1 | 104 | 2 | 52 | 2 | 4 | 13 | $m_{SRS,0}$ is multiple of 16 |
| 40 | 216 | 1 | 108 | 2 | 36 | 3 | 4 | 9 | $m_{SRS,0}$ is multiple of 8; Supported NR BW |
| 41 | 224 | 1 | 112 | 2 | 56 | 2 | 4 | 14 | $m_{SRS,0}$ is multiple of 16 |
| 42 | 232 | 1 | 116 | 2 | 4 | 29 | 4 | 1 | $m_{SRS,0}$ is multiple of 8 |
| 43 | 240 | 1 | 120 | 2 | 60 | 2 | 4 | 15 | $m_{SRS,0}$ is multiple of 16 |
| 44 | 248 | 1 | 124 | 2 | 4 | 31 | 4 | 1 | $m_{SRS,0}$ is multiple of 8 |
| 45 | 256 | 1 | 128 | 2 | 64 | 2 | 4 | 16 | $m_{SRS,0}$ is multiple of 16 |
| 46 | 264 | 1 | 132 | 2 | 12 | 11 | 4 | 3 | $m_{SRS,0}$ is multiple of 8; Supported NR BW |
| 47 | 268 | 1 | 4 | 67 | 4 | 1 | 4 | 1 | Supported NR BW |
| 48 | 272 | 1 | 136 | 2 | 68 | 2 | 4 | 17 | $m_{SRS,0}$ is multiple of 16 |

In the present disclosure, a BS may configure the SRS BW related parameters $C_{SRS}$ and $B_{SRS}$ for a UE and then transmit the configured SRS BW related parameters to the UE through RRC signaling, a MAC-CE, or DCI. In addition, a slot may refer to a time interval consisting of 10 symbols.

Proposal 1 (Intra-slot Hopping)

A BS may assign a UE one BWP as a configuration for SRS transmission. The BS may configure the one BWP using multiple partial bands and configure $C_{SRS}$ for each partial band UE-specifically.

If a UE is incapable of performing the intra-slot hopping in a BWP configured for the UE but is capable of performing the intra-slot hopping in a specific range sub-band within the corresponding BWP, the BS may configure CSRS suitable for the specific range sub-band for the UE. Specifically, when a configured BWP is as M and a range in which a specific UE is capable of performing the intra-slot hopping (or the maximum frequency range where no symbol-basis gap is required due to RF tuning in the case of hopping at a symbol basis (or at a symbol level) is k, the BS may configure the value of $C_{SRS}$ UE-specifically such that the value of $m_{SRS,0}$ satisfies n×k≤M, where n is an integer that allows n×k to be closest to M. The value of $m_{SRS,0}$ may mean the maximum SRS BW where no RF tuning is required in an SRS configuration.

Figure 7:
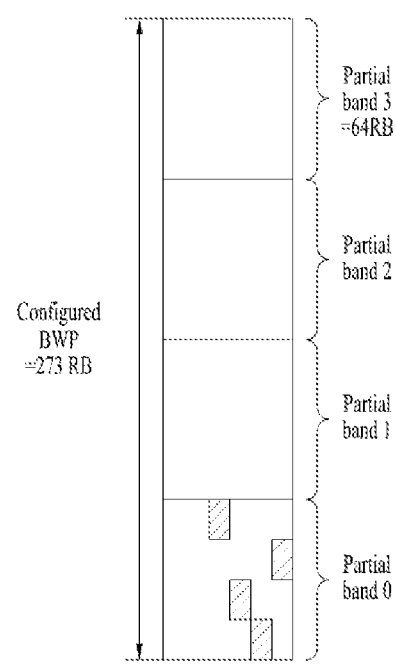
FIG. 7 is a diagram illustrating the configuration of $C_{SRS}$ (i.e., $C_{SRS}$=17) when a UE has a BWP corresponding to 273 RBs and an intra-slot hopping range corresponding to 64 RBs (i.e., $C_{SRS}$=17) as an example of Proposal 1.

FIG. 7 is a diagram illustrating the configuration of $C_{SRS}$ (i.e., $C_{SRS}=17$) when a UE has a BWP corresponding to 273 RBs and an intra-slot hopping range corresponding to 64 RBs (i.e., $C_{SRS}=17$) as an example of Proposal 1.

FIG. 7 shows a BWP in the time-frequency domain where the horizontal axis is the time domain and the vertical axis is the frequency domain. For example, in FIG. 7, the horizontal axis is illustrated as one slot. As shown in FIG. 7, when a UE has a BWP corresponding to 273 RBs and an intra-slot hopping range corresponding to 64 RBs, a BS may set $C_{SRS}$ to 17 according to Table 12 such that the BWP is divided into four 64-RB sounding regions (four partial bands) since the 273-RB BWP is greater than 64 RBs×4 (256 RBs) and smaller than 64 RBs×5 (320 RBs).

Proposal 1-1

Although an SRS BW may be set to the maximum SRS BW where no RF tuning is required even if hopping is performed on a symbol basis in a configured BWP, a BS may configure $C_{SRS}$ suitable for a specific range sub-band based on the number of SRS symbols configured in a specific slot.

As an example of Proposal 1-1, when a UE has a BWP corresponding to 273 RBs and an intra-slot hopping range corresponding to 128 RBs, the BS may divide the BWP into two 128-RB sounding regions since the 273-RB BWP is greater than 128 RBs×2 (256 RBs) and smaller than 128 RBs×3 (384 RBs). However, if the number of SRS symbols configured in a slot, the BS may set $C_{SRS}$ to 17 according to Table 2 such that 64-RB sounding is allowed in order to perform the intra-slot hopping up to the corresponding range (128 RBs) in one slot.

Proposal 2 (Inter-slot Hopping)

When UEs capable of performing the intra-slot hopping in a specific range subband within a configured BWP perform the inter-slot hopping for BWP sounding, a frequency start position for SRS allocation, $\bar{k}_0^{(p)}$ may be moved by $m_{SRS,0}$ of configured $C_{SRS}$ in a slot where each SRS is configured. The start position is aligned with a common grid (i.e., 4-RB basis).

A BS may determine the frequency start position for the SRS allocation ($\bar{k}_0^{(p)}$ ($n_{SRS}$) (e.g., the frequency start location of $n_{SRS}$-th SRS allocation) based on a specific hopping pattern and then transmit the frequency start position to a UE through RRC signaling. In this case, $\bar{k}_0^{(p)}(n_{SRS})= \bar{k}_0^{(p)}+F(n_{SRS})$, the hopping pattern for the frequency start position for the SRS allocation is $F(n_{SRS})=f(n_{SRS})\times m_{SRS,0}\times 12$, and $\bar{k}_0^{(p)}$ is aligned with the common grid. In addition, the BS may determine $\bar{k}_0^{(p)}$ when configuring the BWP.

In the case of an aperiodic SRS, when the SRS is triggered, the BS may configure the frequency start position for the SRS allocation ($\bar{k}_0^{(p)}(n_{SRS})$) and then transmit the frequency start position to the UE through DCI.

Figure 8:
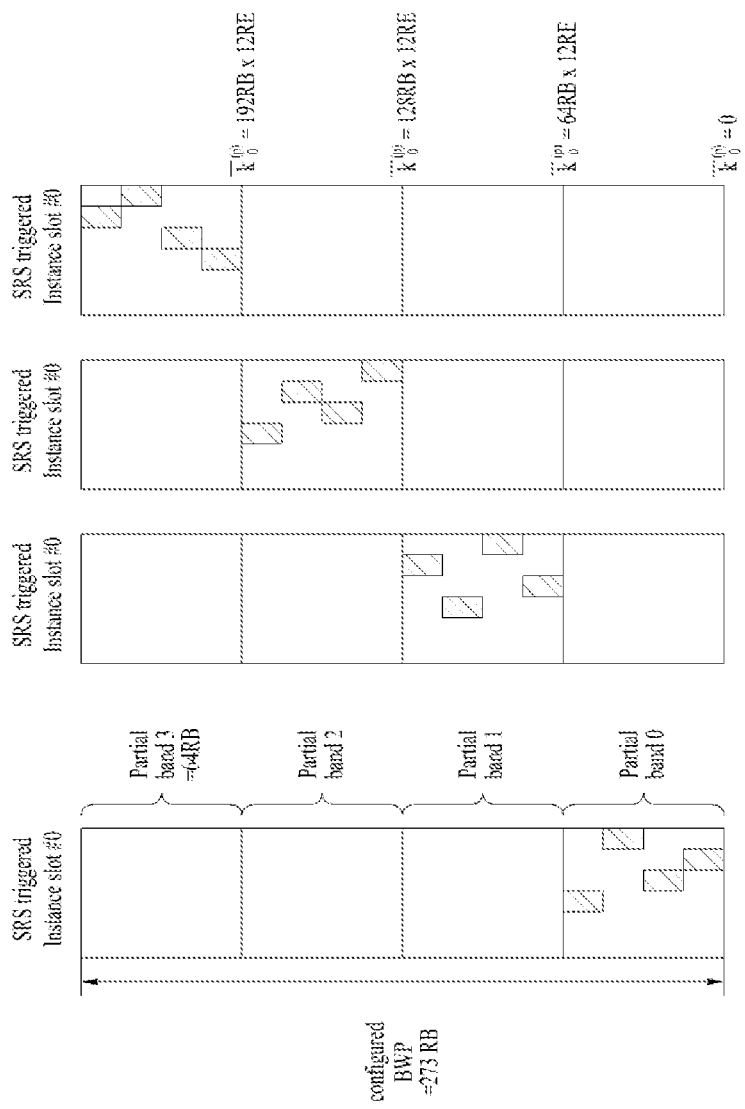
FIG. 8 is a diagram illustrating the configuration of a frequency start position for sounding reference signal (SRS) allocation as an example of Proposal 2.

FIG. 8 is a diagram illustrating the configuration of a frequency start position for SRS allocation as an example of Proposal 2.

According to Proposal 2, when a BWP is 273 RBs and a partial band is 64 RBs, if a SRS start frequency position in the first SRS slot $\bar{k}_0^{(p)}$ is 0 (or a 0-th RE), SRS start frequency positions in the second, third, and fourth slots may be $\bar{k}_0^{(p)}=m_{SRS,0}\times 12RE$, $\bar{k}_0^{(p)}=2\times m_{SRS,0}12RE$, and $\bar{k}_0^{(p)}=3\times m_{SRS,0}\times 12RE$, respectively.

Equation 1 shows $n_{SRS}$ based on a hopping pattern for SRS frequency start positions.

$$n_{SRS} = l' + N_{symbol} \times \lfloor (n_f \times N_s + n_s)/T_{SRS} \rfloor \quad \text{[Equation 1]}$$

In Equation 1, $n_{SRS}$ denotes an SRS counter related to the number of times that an SRS is transmitted, l denotes a symbol index, $N_{symbol}$ denotes the number of SRS symbols configured in one slot, $N_s$ denotes the number of slots in one radio frame, $n_f$ denotes a radio frame index, $n_s$ denotes a slot index in one radio frame, and $T_{SRS}$ denotes a periodicity which a UE-specific SRS is transmitted with.

When an SRS triggering slot is configured according to Equation 1 and a hopping pattern is defined as $F(n_{SRS})=f(n_{SRS})\times m_{SRS,0}\times 12$ by a function for the start position hopping pattern, $f(n_{SRS})=n_{SRS} \mod N_p$ where $N_p$ is the value of n configured in Proposal 1), if a BWP is 273 RBs and a partial band is 64 RBs as shown in FIG. 7 and $n_f=0$, the inter-slot hopping may be performed as shown in FIG. 8.

Thus, according to the above-described configuration method, the inter-slot hopping may be performed at an instance when RF retuning is performed, thereby preventing a distortion caused by the RF retuning.

Figure 9:
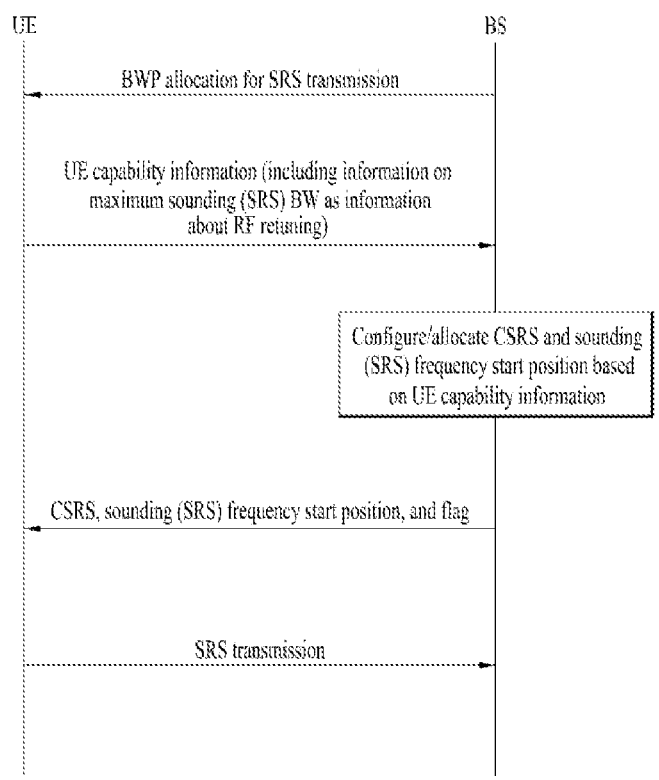
FIG. 9 is a diagram illustrating a procedure for a UE to transmit an SRS and a procedure for a base station (BS) to receive the SRS according to Proposals 1 and 2.

FIG. 9 is a diagram illustrating a procedure for a UE to transmit an SRS and a procedure for a BS to receive the SRS according to Proposals 1 and 2.

Procedure for BS to Receive SRS According to Proposals 1 and 2.

Referring to FIG. 9, a BS may transmit to a UE information on a BWP configured for SRS transmission. The BS may receive from the UE UE capability information including information on a frequency BW where the UE is capable of performing SRS frequency hopping (intra-slot hopping or inter-slot hopping). In this case, the frequency BW where the UE is capable of performing the SRS frequency hopping may correspond to a partial frequency BW within the BWP configured for the SRS transmission. The frequency BW where the UE is capable of performing the SRS frequency hopping (intra-slot hopping or inter-slot hopping) may be determined by RF retuning capability of the UE.

The BS may configure first information on an SRS BW configuration and second information on an SRS frequency start position for the SRS transmission based on the UE capability information. Although the present disclosure describes that the UE transmits the UE capability information to the BS and the BS configures the first information on the SRS BW configuration and the second information on the SRS frequency start position for the SRS transmission based on the UE capability information transmitted from the UE, the UE may skip the transmission of the UE capability information if the BS knows the capability of the UE.

The BS may transmit to the UE the first information on the SRS BW configuration and the second information on the SRS frequency start position. The BS may receive an SRS from the UE based on the first information on the SRS BW configuration and the second information on the SRS frequency start position. The BS may further transmit to the UE third information on whether the UE operates in a mode of transmitting the SRS by performing frequency hopping at a frequency BW level capable of the SRS frequency hopping within the BWP (the third information may be a flag type information and is represented as a flag in FIG. 9). The BS may receive the SRS further based on the third information.

The first information on the SRS BW configuration, the second information on the SRS frequency start position for the SRS transmission, and the third information on whether the UE operates in the mode of transmitting the SRS by performing the frequency hopping at the frequency BW level capable of the SRS frequency hopping within the BWP may be transmitted through RRC signaling, a MAC-CE, or DCI.

The BS may configure the first information on the SRS BW configuration based on the number of SRS symbols configured in a predetermined slot.

Procedure for UE to Transmit SRS According to Proposals 1 and 2

A UE may transmit to a BS UE capability information including information on a frequency BW where the UE is capable of performing SRS frequency hopping. In this case, the frequency BW where the UE is capable of performing the SRS frequency hopping may correspond to a partial frequency BW within a BWP configured for SRS transmission. The frequency BW where the UE is capable of performing the SRS frequency hopping (intra-slot hopping or inter-slot hopping) may be determined by RF retuning capability of the UE. The UE may receive from the BS first information on an SRS BW configuration and second information on an SRS frequency start position for the SRS transmission. The UE may transmit an SRS to the BS based on the first information on the SRS BW configuration and the second information on the SRS frequency start position for the SRS transmission. The first information on the SRS BW configuration and the second information on the SRS frequency start position for the SRS transmission may be determined based on the UE capability information. The UE may skip the transmission of the UE capability information if the BS knows the capability of the UE.

The UE may further receive from the BS third information on whether the UE operates in a mode of transmitting the SRS by performing frequency hopping at a frequency BW level capable of the SRS frequency hopping within the BWP. The UE may transmit the SRS further based on the third information on whether the UE operates in the mode of transmitting the SRS by performing the frequency hopping at the frequency BW level capable of the SRS frequency hopping within the BWP. The first information on the SRS BW configuration may be determined based on the number of SRS symbols configured in a predetermined slot. The UE may receive from the BS information on the BWP configured for the SRS transmission at the UE. The SRS frequency hopping may be the inter-slot hopping or the intra-slot hopping.

Figure 10:
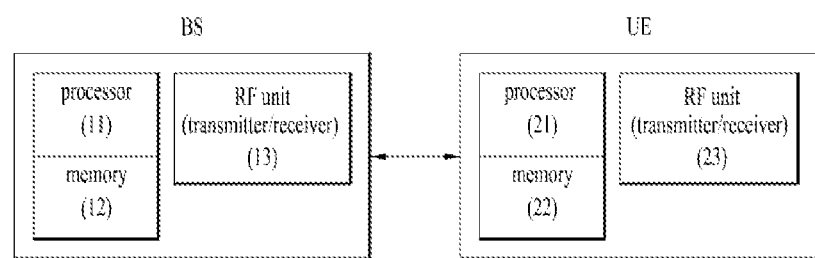
FIG. 10 is a block diagram illustrating a UE for transmitting an SRS and a BS for receiving the SRS according to Proposals 1 and 2.

FIG. 10 is a block diagram illustrating a UE for transmitting an SRS and a BS for receiving the SRS according to Proposals 1 and 2.

BS for Receiving SRS According to Proposals 1 and 2

Referring to FIG. 10, a transmitter 13 of a BS may be configured to transmit to a UE information on a BWP configured for SRS transmission. A receiver 13 of the BS may be configured to receive from the UE UE capability information including information on a frequency BW where the UE is capable of performing SRS frequency hopping (intra-slot hopping or inter-slot hopping). In this case, the frequency BW where the UE is capable of performing the SRS frequency hopping may correspond to a partial frequency BW within the BWP configured for the SRS transmission. The frequency BW where the UE is capable of performing the SRS frequency hopping (intra-slot hopping or inter-slot hopping) may be determined by RF retuning capability of the UE.

A processor 11 of the BS may be configured to configure first information on an SRS BW configuration and second information on an SRS frequency start position for the SRS transmission based on the UE capability information. Although the present disclosure describes that the UE transmits the UE capability information to the BS and the BS configures the first information on the SRS BW configuration and the second information on the SRS frequency start position for the SRS transmission based on the UE capability information transmitted from the UE, the UE may skip the transmission of the UE capability information if the BS knows the capability of the UE.

The transmitter 13 of the BS may be configured to transmit to the UE the first information on the SRS BW configuration and the second information on the SRS frequency start position. The processor 11 of the BS may be configured to control the receiver 13 to receive an SRS from the UE based on the first information on the SRS BW configuration and the second information on the SRS frequency start position. The transmitter 13 of the BS may be configured to further transmit to the UE third information on whether the UE operates in a mode of transmitting the SRS by performing frequency hopping at a frequency BW level capable of the SRS frequency hopping within the BWP (the third information may be a flag type information and is represented as a flag in FIG. 9). The processor 11 of the BS may be configured to control the receiver 13 to receive the SRS further based on the third information.

The first information on the SRS BW configuration, the second information on the SRS frequency start position for the SRS transmission, and the third information on whether the UE operates in the mode of transmitting the SRS by performing the frequency hopping at the frequency BW level capable of the SRS frequency hopping within the BWP may be transmitted through RRC signaling, a MAC-CE, or DCI.

The processor 11 of the BS may be configured to configure the first information on the SRS BW configuration based on the number of SRS symbols configured in a predetermined slot.

UE for Transmitting SRS According to Proposals 1 and 2

A transmitter 23 of a UE may be configured to transmit to a BS UE capability information including information on a frequency BW where the UE is capable of performing SRS frequency hopping. In this case, the frequency BW where the UE is capable of performing the SRS frequency hopping may correspond to a partial frequency BW within a BWP configured for SRS transmission. The frequency BW where the UE is capable of performing the SRS frequency hopping (intra-slot hopping or inter-slot hopping) may be determined by RF retuning capability of the UE. A receiver 23 of the UE may be configured to receive from the BS first information on an SRS BW configuration and second information on an SRS frequency start position for the SRS transmission. A processor 12 of the UE may be configured to control the transmitter 23 to transmit an SRS to the BS based on the first information on the SRS BW configuration and the second information on the SRS frequency start position for the SRS transmission. The first information on the SRS BW configuration and the second information on the SRS frequency start position for the SRS transmission may be determined based on the UE capability information. The UE may skip the transmission of the UE capability information if the BS knows the capability of the UE.

The receiver 23 of the UE may be configured to further receive from the BS third information on whether the UE operates in a mode of transmitting the SRS by performing frequency hopping at a frequency BW level capable of the SRS frequency hopping within the BWP. The processor 21 of the UE may be configured to control the transmitter 23 to transmit the SRS further based on the third information. The first information on the SRS BW configuration may be determined based on the number of SRS symbols configured in a predetermined slot. The receiver 23 of the UE may be configured to receive from the BS information on the BWP configured for the SRS transmission at the UE. The SRS frequency hopping may be the inter-slot hopping or the intra-slot hopping.

According to the present disclosure, when sounding is required for one configured uplink BWP, which is configured when SRS transmission is performed in the NR system, the sounding for the configured BWP may be supported for UEs incapable of performing transmission in the configured BWP due to limitations such as a UE link budget (e.g., cell-edge UEs) and UEs with intra-slot hopping ranges that do not cover the configured BWP (e.g., UEs that require a time for RF retuning since the UEs have values greater than k, which is a range of BWs where a UE is capable of performing the sounding and is less than the configured BWP).

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The methods for transmitting and receiving an SRS and communication devices therefor may be industrially applied to various wireless communication systems including the 3GPP LTE/LTE-A system, the NR (5G) communication system, etc.

The invention claimed is:

1. A method of transmitting a sounding reference signal (SRS) by a user equipment (UE), the method comprising:
   transmitting, to a base station (BS), UE capability information for transmission of the SRS;
   receiving, from the BS, first information for configuring an SRS bandwidth and second information on an SRS frequency start position for transmission of the SRS,
   wherein the SRS bandwidth is determined based on a combination of two parameters in a predefined table for configuring the SRS bandwidth,
   wherein a first parameter of the two parameters is an index representing a row of the predefined table, a second parameter of the two parameters has a value among {0, 1, 2, 3}, and the first parameter is determined based on a number of SRS symbols configured in one slot and wherein the first information includes information representing the two parameters; and
   transmitting, to the BS, the SRS with intra-slot frequency hopping based on the first and second information,
   wherein the UE capability information includes information on a bandwidth for SRS frequency hopping,
   wherein the bandwidth for the SRS frequency hopping corresponds to a partial band among a plurality of partial bands included in a bandwidth part (BWP) configured for the UE, and the combination of the two parameters determined based on the UE capability information represents the partial band.

2. The method of claim 1, wherein the first and second information are determined by the UE capability information.

3. The method of claim 1, further comprising receiving, from the BS, third information on whether the UE operates in a mode of transmitting the SRS by performing frequency hopping at a frequency bandwidth level capable of the SRS frequency hopping within the SRS bandwidth, wherein the SRS is transmitted further based on the third information.

4. The method of claim 1, further comprising:
   receiving information on the BWP configured for the UE, and
   wherein the BWP is configured for transmission of the SRS.

5. A method of receiving a sounding reference signal (SRS) by a base station (BS), the method comprising:
   receiving, from a user equipment (UE), UE capability information for transmission of the SRS;
   configuring first information for configuring an SRS bandwidth and second information on an SRS frequency start position for transmission of the SRS based on the UE capability information,
   wherein the SRS bandwidth is determined based on a combination of two parameters in a predefined table for configuring the SRS bandwidth,
   wherein a first parameter of the two parameters is an index representing a row of the predefined table, a second parameter of the two parameters has a value among {0, 1, 2, 3}, and the first parameter is determined based on a number of SRS symbols configured in one slot, and
   wherein the first information includes information representing the two parameters;
   transmitting, to the UE, the first and second information; and
   receiving, from the UE, the SRS with intra-slot frequency hopping based on the first and second information,
   wherein the UE capability information includes information on a bandwidth for SRS frequency hopping,
   wherein the bandwidth for the SRS frequency hopping corresponds to a partial band among a plurality of partial bands included in a bandwidth part (BWP) configured for the UE, and the combination of the two parameters determined based on the UE capability information represents the partial band.

6. The method of claim 5, further comprising transmitting, to the UE, third information on whether the UE operates in a mode of transmitting the SRS by performing frequency hopping at a frequency bandwidth level capable of the SRS frequency hopping within the SRS bandwidth, wherein the SRS is received further based on the third information.

7. The method of claim 5, further comprising;
   transmitting, to the UE, information on the BWP configured for the UE,
   wherein the BWP is configured for transmission of the SRS.

8. A user equipment (UE) for transmitting a sounding reference signal (SRS), the UE comprising:
   a transmitter configured to transmit, to a base station (BS), UE capability information for transmission of the SRS;
   a receiver configured to receive, from the BS, first information for configuring an SRS bandwidth and second information on an SRS frequency start position for transmission of the SRS wherein the SRS bandwidth is determined based on a combination of two parameters in a predefined table for configuring the SRS bandwidth, wherein a first parameter of the two parameters is an index representing a row of the predefined table, a second parameter of the two parameters has a value among {0, 1, 2, 3}, and the first parameter is determined based on a number of SRS symbols configured in one slot, and wherein the first information includes information representing the two parameters; and a processor configured to control the transmitter to transmit, to the BS, the SRS with intra-slot frequency hopping based on the first and second information, wherein the UE capability information includes information on a bandwidth for SRS frequency hopping, wherein the bandwidth for the SRS frequency hopping corresponds to a partial band among a plurality of partial bands included in a bandwidth part (BWP) configured for the UE, and the combination of the two parameters determined based on the UE capability information represents the partial band.

9. The UE of claim 8, wherein the receiver is configured to receive, from the BS, third information on whether the UE operates in a mode of transmitting the SRS by performing frequency hopping at a frequency bandwidth level capable of the SRS frequency hopping within the SRS bandwidth, and the processor is configured to control the transmitter to transmit the SRS further based on the third information.

10. The UE of claim 8, wherein the receiver is configured to receive information on the BWP configured for the UE, and wherein the BWP is configured for transmission of the SRS.

11. A base station (BS) for receiving a sounding reference signal (SRS), the BS comprising:

a receiver configured to receive, from a user equipment (UE), UE capability information for transmission of the SRS;

a processor configured to configure first information for configuring an SRS bandwidth configuration and second information on an SRS frequency start position for transmission of the SRS based on the UE capability information, wherein the SRS bandwidth is determined based on a combination of two parameters in a predefined table for configuring the SRS bandwidth, wherein a first parameter of the two parameters is an index representing a row of the predefined table, a second parameter of the two parameters has a value among {0, 1, 2, 3}, and the first parameter is determined based on a number of SRS symbols configured in one slot, and wherein the first information includes information representing the two parameters; and a transmitter configured to transmit, to the UE, the first and second information, wherein the processor is configured to control the receiver to receive, from the UE, the SRS with intra-slot frequency hopping based on the first and second information, and wherein the UE capability information includes information on a bandwidth for SRS frequency hopping, wherein the bandwidth for the SRS frequency hopping corresponds to a partial band among a plurality of partial bands included in a bandwidth part (BWP) configured for the UE, and the combination of the two parameters determined based on the UE capability information represents the partial band.

12. The BS of claim 11, wherein the transmitter is configured to transmit, to the UE, third information on whether the UE operates in a mode of transmitting the SRS by performing frequency hopping at a frequency bandwidth level capable of the SRS frequency hopping within the SRS bandwidth, and wherein the processor is configured to control the receiver to receive the SRS further based on the third information.

13. The UE of claim 8, wherein the UE is capable of communicating with at least one of another UE, a UE related to an autonomous driving vehicle, a base station or a network.

* * * * *